(No Model.)

3 Sheets—Sheet 1

S. R. S. UFFORD.
TWO WHEELED VEHICLE.

No. 260,808.

Patented July 11, 1882.

WITNESSES
Jas. E. Hutchinson.
Geo. D. Seymour.

INVENTOR
Stephen R. S. Ufford
By H. A. Seymour.
Attorney

N. PETERS, Photo-Lithographer, Washington, D. C.

(No Model.) 3 Sheets—Sheet 2.

S. R. S. UFFORD.
TWO WHEELED VEHICLE.

No. 260,808. Patented July 11, 1882.

WITNESSES
Jas. E. Hutchinson.
Geo. A. Seymour.

INVENTOR
Stephen R. S. Ufford
By H. A. Seymour.
Attorney (No Model.) 3 Sheets—Sheet 3.

S. R. S. UFFORD.
TWO WHEELED VEHICLE.

No. 260,808. Patented July 11, 1882.

WITNESSES
Jas. E. Hutchinson.
Geo. D. Seymour.

INVENTOR
Stephen R. S. Ufford.
By H. A. Seymour.
Attorney

UNITED STATES PATENT OFFICE.

STEPHEN R. S. UFFORD, OF BATAVIA, ASSIGNOR OF ONE-HALF TO R. R. HALL, OF AURORA, ILLINOIS.

TWO-WHEELED VEHICLE.

SPECIFICATION forming part of Letters Patent No. 260,808, dated July 11, 1882.

Application filed April 18, 1882. (No model.)

*To all whom it may concern:*

Be it known that I, STEPHEN R. S. UFFORD, of Batavia, in the county of Kane and State of Illinois, have invented certain new and useful Improvements in Vehicles; and I do hereby declare the following to be a full, clear, and exact description of the invention, such as will enable others skilled in the art to which it pertains to make and use the same.

My invention relates to two-wheel vehicles, the object being to provide a vehicle of strong and durable construction, so that all liability of breakage by strain will be avoided.

A further object of the invention is to provide a two-wheel vehicle with an improved arrangement of springs, whereby the travel of the vehicle will be light and easy and the damage incident to sudden jolts avoided.

A further object of the invention is to provide a vehicle with devices for changing the draft from a center to a side draft.

The invention consists in the improved construction and combinations of parts hereinafter described, and pointed out in the claims.

Figure 1:
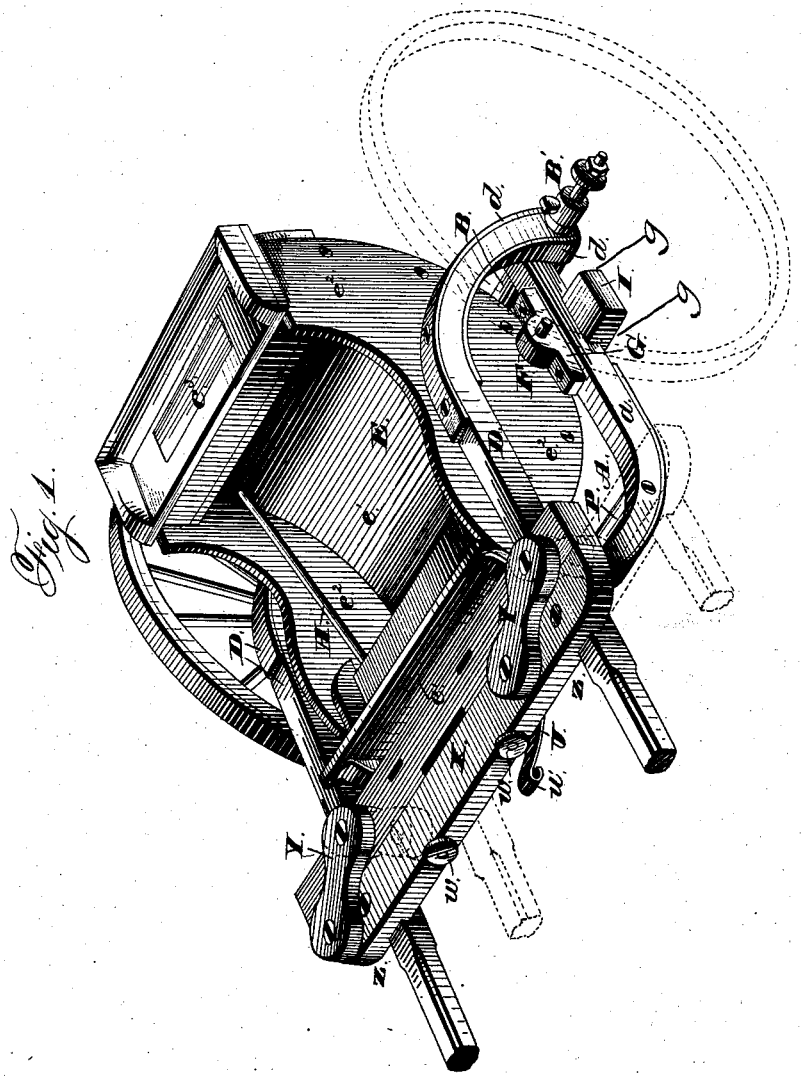
Figure 2:
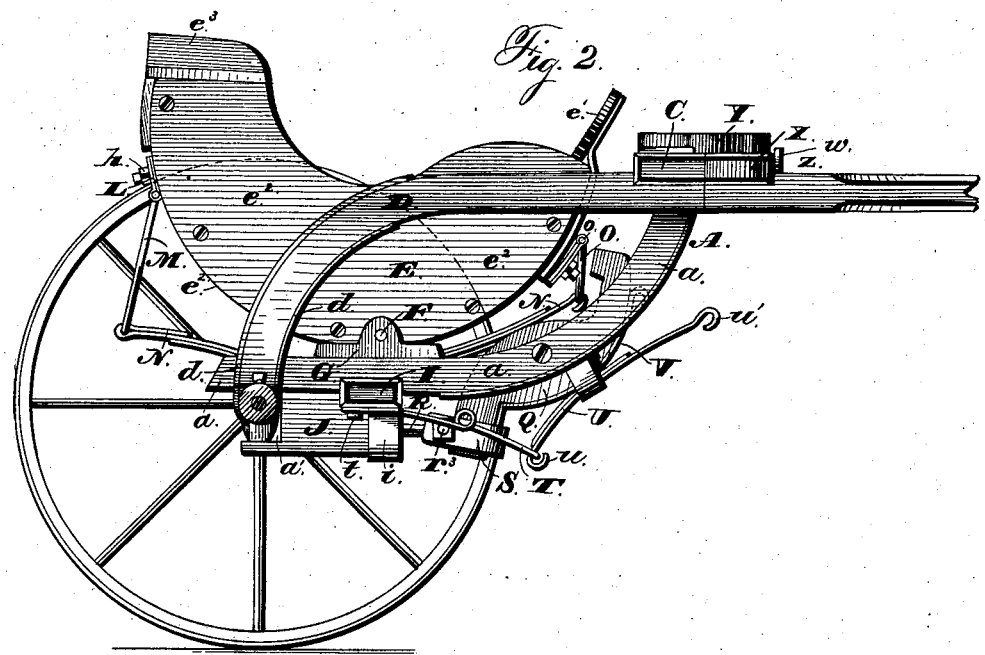
Figure 3:
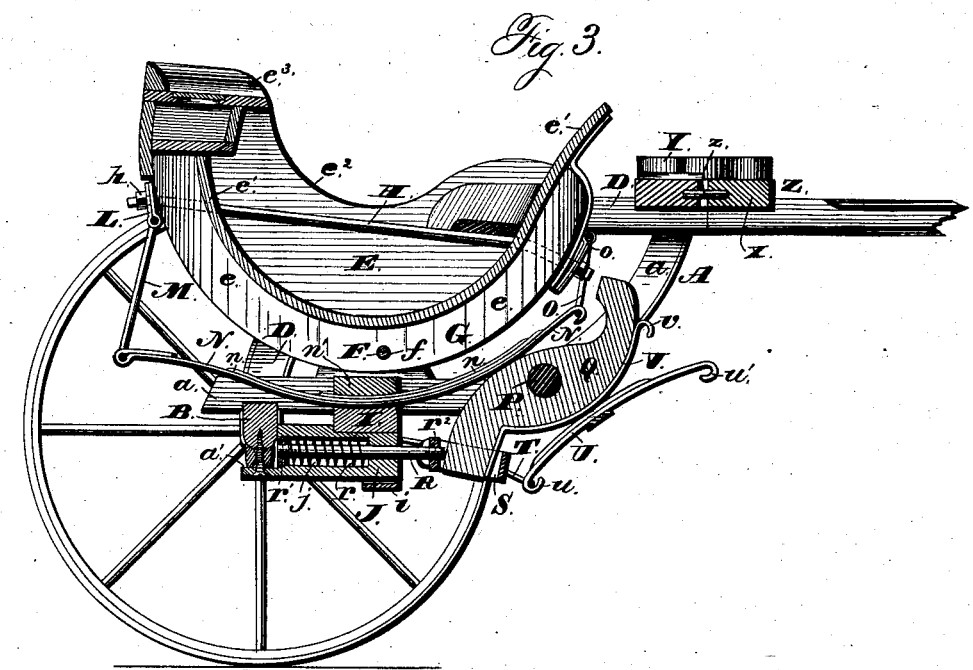
Figure 4:
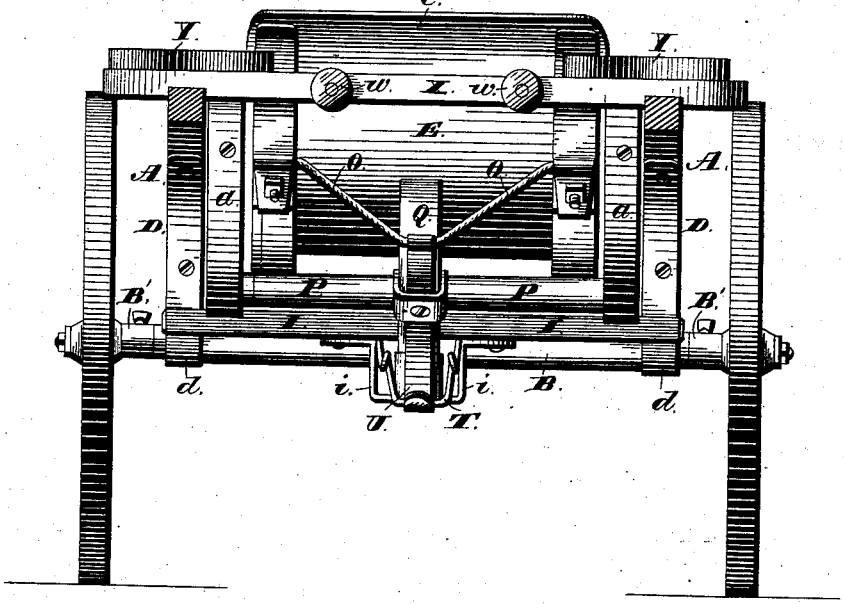
Figure 5:
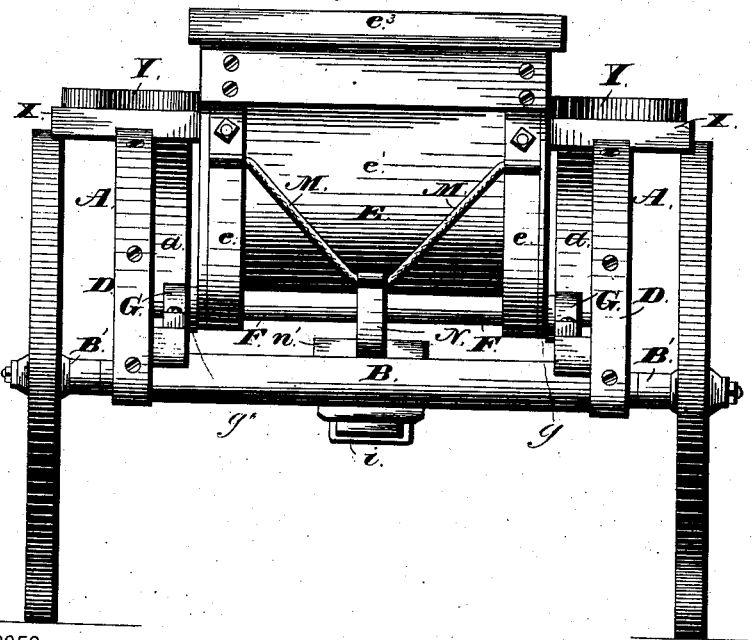

In the drawings, Figure 1 is a view in perspective of a vehicle constructed in accordance with my invention. Fig. 2 is a side view of the same. Fig. 3 is a vertical central section. Fig. 4 is a front elevation, and Fig. 5 is a view of the rear end of the vehicle.

A represents the supporting-frame of the vehicle, consisting of the runner-shaped side pieces, $a\, a$, secured at their rear ends to the axle B, and a cross-bar, C, secured to the forward ends of the side pieces, $a\, a$.

D D represent the rear downwardly-bent bows or extensions of the thills, which are secured at either end of the axle B outside of the side pieces, $a\, a$, by embracing strips $d\, d$, which pass under the ends of the axle and are secured to the upper and under edges of the bows.

E represents the body of the vehicle, consisting of the semicircular bed-pieces $e\, e$, the combined bottom and dash-board $e'$, secured to said bed-pieces, and the semicircular sides $e^2\, e^2$, also secured to the bed-pieces. $e^3$ represents the vehicle-seat. The body thus formed is balanced upon a rigid transverse rod, F, which passes through perforations $f$ formed at about the center of the bed-pieces $e\, e$. The ends of this rod F project beyond the body at each side, and are supported in movable bearings or brackets G G, secured to the upper sides of the pieces $a\, a$ of the frame by screws $g\, g$, or equivalent means. In addition to serving as the pivotal support of the body, the rod F serves as a transverse stay or brace for the latter. Suitable washers, $g'$, are interposed between the bearings G and the sides of the body.

H H represent tie bolts or rods, arranged on either side of the body, and passing respectively through the front and rear of the main portion $e'$ of the body and through the bed-pieces $e\, e$, and being secured in place by nuts $h$ at the front and rear of the body.

I represents a cross-bar secured to the under sides of the side pieces, $a\, a$, in front of and parallel with the axle B, with which latter it is connected by a recessed block, J, said block being cut away, as shown at $a'$, to receive the axle, and held in place upon the under side of the cross-bar I by a guide-loop, $i$, embracing the block J, and secured on either side of the latter to said cross-bar.

L L represent supporting eye-pieces or brackets, secured at the rear ends of the bed-pieces $e\, e$ upon the projecting ends of the tie-bolts H H by the nuts $h$. Within these brackets L L are secured the ends of a swinging bail, M, to the center of which is secured the rear end of the main longitudinal spring N, which passes centrally beneath the body, and is secured by a block, $n'$, to the cross-bar I, and is adapted to be connected at its forward end to a swinging bail, O, which latter is held in brackets $o\, o$, secured to the forward projecting ends of the tie-bolts H H by nuts $h$.

$n\, n$ represent short auxiliary springs arranged on either side of the main central spring, N, and overlapping each other at a central point on the latter, and held by the block $n'$. The arrangement of the cross-bar I in front of the axle and the connection of the springs thereto effectually break the force of any sudden jolt upon the vehicle.

P represents a transverse rod secured to the side pieces, $a\, a$, parallel to the cross-bar I, beneath the forward end of the body. Upon this bar P is centrally fulcrumed an S-shaped lever, Q.

Within the recess $j$ of the block J is arranged a spring-rod, R, surrounded by a spiral spring, r, and provided at its rear end with a head or disk, r', and a screw-thread at its forward end to receive a nut, r², which latter is provided with laterally-projecting screw-threaded studs r³, upon which are secured the ends of a swinging coupling-bail, S, by nuts s. This bail S is adapted to be swung over the lower end of the lever Q.

T represents a connecting-bail arranged to embrace the bail S and the lower end of the lever Q. The ends of this bail T pass between the guide-loop i and the cross-bar I, and are secured to studs t projecting from the cross-bar on either side of the block J. The office of this guard-bail T is to engage the lower hook, u, of a spring, U, secured at a central point to the front edge of the lever Q, and provided at its upper end with a hook, u', to which the forward swinging bail, O, may be attached. The lower half of the spring U is stiffened by interposing between said spring and the lever Q an auxiliary leaf, u².

V represents a rigid metallic strip bent to correspond to the form of the front edge of the lever Q, to which it is secured, and terminating at its upper end in a hook, v, below the upper end of the lever Q, adapted to engage with the bail O. The upper half of the spring U will readily adapt itself when in use to the curvature of the lever Q, so that all liability of breakage is avoided. The lower half of said spring U, as above stated, is provided with an auxiliary strengthening-leaf, and is not brought into operation unless the load upon the vehicle is very heavy, and until the upper half of said spring has been brought in contact throughout its entire length with the front edge of the lever Q.

To the forward cross-bar, C, of the vehicle is connected the thill cross-bar X by rotating links Y, the latter being pivoted at their inner ends to the cross-bar C and at their opposite ends to the thill-bar X, so that when the thills are in the position shown in Fig. 1 said links will be diagonally parallel with each other. By this construction the thills Z are adapted to be held, as shown in full lines, Fig. 1, for a center draft, or to be turned to one side, as shown in dotted lines of Fig. 1, for a side draft. In either position the thill-bar X and the cross-bar C are secured together by means of removable screw-bolts w, passing through perforations in said bars, and by studs z, projecting from the forward edge of the cross-bar C and adapted to enter perforations of the thill-bar X.

By the construction above described the vehicle-body is compact and secure, the bottom and dash-board being formed in one piece. The body is securely protected against both lateral and longitudinal strain by means of the tie-bolts H H and cross-rod F.

The series of springs described adapts the vehicle for either a light or heavy load. When a light load is upon the vehicle the forward swinging bail, O, is attached to the spring N, as shown, while for a heavy load it should be attached to the hook v of the strip V. The springs arranged as described are fully protected against breakage or undue strain from sudden jerks or jolts, and the vehicle will run smoothly with little liability to breakage or disarrangement of its parts.

The spindles B' of the axle B are made removable to adapt the vehicle to be used with runners when desired.

Having fully described my invention, what I claim as new, and desire to secure by Letters Patent, is—

1. The combination, with a vehicle-body of semicircular form, of longitudinal tie-rods passing through the body and secured at their front and rear ends by nuts, substantially as set forth.

2. The combination, with the semicircular bed-pieces of the body, of a transverse rod passing through the sides of said bed-pieces and secured in bearings below the body, substantially as set forth.

3. The combination, with the semicircular bed-pieces of the body and with the side pieces of the supporting-frame, of a transverse rod passing through said bed-pieces and secured in movable bearings of the side pieces, substantially as set forth.

4. The combination, with the semicircular body, of a front and a rear swinging bail and a longitudinal spring or springs secured to said bails and to a cross-bar beneath the body, substantially as set forth.

5. The combination, with the supporting-frame of a semicircular body braced by tie-rods and balanced on a transverse rod, the latter being secured in bearings of the frame, of a forward and a rear swinging bail and a longitudinal spring or springs connecting said bails and secured to the frame, substantially as set forth.

6. The combination, with the side pieces of the frame and with the body, of a transverse rod secured near the forward end of the frame in bearings in said side pieces, and an S-shaped lever centrally fulcrumed on said rod and provided with a series of springs, substantially as set forth.

7. The combination, with the axle and the cross-bar arranged adjacent thereto, of a recessed block connecting said axle and cross-bar and adapted to receive a spring-rod, the latter being surrounded by a spiral spring and provided with a coupling-bail and an S-shaped lever, whose lower end is adapted to engage with said coupling-bail, while its forward end is provided with a hooked spring to receive a swinging bail of the body, substantially as set forth.

8. The combination, with the body provided with a front and a rear swinging bail, of a central longitudinal spring adapted to be connected with said bails, an S-shaped lever centrally fulcrumed on a transverse rod near the forward end of the frame, the lower end of said lever being adapted to be connected with a spring-pressed rod, while the front edge of said lever is provided with a hook or hooks adapted to engage the forward swinging bail of the body, substantially as set forth.

9. The combination, with the semicircular body provided with swinging bails, as described, of a central longitudinal spring, an S-shaped lever, and a forward spring centrally secured to said lever, and provided at its upper end with a hook to engage the forward swinging bail and at its lower end with a hook to engage a connecting-bail secured to the under side of the cross-bar of the frame, substantially as set forth.

10. The combination, with the perforated front cross-bar of the frame and the perforated thill cross-bar, of parallel connecting-links, whereby the thills may be changed from a center to a side draft, and removable screw-bolts adapted to the perforations of the cross-bars, substantially as set forth.

In testimony whereof I have signed this specification in the presence of two subscribing witnesses.

STEPHEN R. S. UFFORD.

Witnesses:
EDWD. A. BRADLEY,
MILTON DENNEY.